(12) United States Patent
Meiri et al.

(10) Patent No.: US 9,110,693 B1
(45) Date of Patent: Aug. 18, 2015

(54) VM MOBILITY OVER DISTANCE

(75) Inventors: David Meiri, Cambridge, MA (US); Balakrishnan Ganeshan, Foster City, CA (US); Muralidhar Balcha, Upton, MA (US); Dan Arnon, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 1075 days.

(21) Appl. No.: 12/932,080

(22) Filed: Feb. 17, 2011

(51) Int. Cl.
*G06F 9/455* (2006.01)
*G06F 9/48* (2006.01)

(52) U.S. Cl.
CPC .............. *G06F 9/455* (2013.01); *G06F 9/4856* (2013.01); *G06F 9/45558* (2013.01); *G06F 2009/4557* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 6,625,751 B1* | 9/2003 | Starovic et al. | 714/11 |
| 7,313,637 B2* | 12/2007 | Tanaka et al. | 710/8 |
| 7,340,489 B2 | 3/2008 | Vishlitzky et al. | |
| 7,370,164 B1* | 5/2008 | Nagarkar et al. | 711/162 |
| 7,383,405 B2* | 6/2008 | Vega et al. | 711/162 |
| 7,484,208 B1* | 1/2009 | Nelson | 718/1 |
| 7,577,722 B1* | 8/2009 | Khandekar et al. | 709/220 |
| 7,603,670 B1* | 10/2009 | van Rietschote | 718/1 |
| 7,680,919 B2* | 3/2010 | Nelson | 709/223 |
| 8,135,930 B1* | 3/2012 | Mattox et al. | 711/162 |
| 8,234,469 B2* | 7/2012 | Ranade | 711/162 |
| 8,407,518 B2* | 3/2013 | Nelson et al. | 714/13 |
| 8,413,145 B2* | 4/2013 | Chou et al. | 718/1 |
| 8,549,515 B2* | 10/2013 | Bobroff et al. | 718/1 |
| 8,621,274 B1* | 12/2013 | Forgette et al. | 714/10 |
| 8,656,388 B2* | 2/2014 | Chou et al. | 718/1 |
| 2004/0010787 A1* | 1/2004 | Traut et al. | 718/1 |
| 2007/0094659 A1* | 4/2007 | Singh et al. | 718/1 |
| 2008/0163239 A1* | 7/2008 | Sugumar et al. | 718/105 |
| 2008/0184225 A1* | 7/2008 | Fitzgerald et al. | 718/1 |
| 2008/0201711 A1* | 8/2008 | Amir Husain | 718/1 |
| 2009/0037680 A1* | 2/2009 | Colbert et al. | 711/162 |
| 2009/0113109 A1* | 4/2009 | Nelson et al. | 711/6 |
| 2009/0198817 A1* | 8/2009 | Sundaram et al. | 709/227 |
| 2010/0106885 A1* | 4/2010 | Gao et al. | 711/6 |
| 2010/0107158 A1* | 4/2010 | Chen et al. | 718/1 |
| 2010/0191845 A1* | 7/2010 | Ginzton | 709/224 |

(Continued)

OTHER PUBLICATIONS

"VMware Virtual Machine File System: Technical Overview and Best Practices," VMware Technical White Paper, Version 1.0, WP-022-PRD-01-01, 2007, 19 pp.

(Continued)

*Primary Examiner* — Emerson Puente
*Assistant Examiner* — Hiren Patel
(74) *Attorney, Agent, or Firm* — Muirhead and Saturnelli, LLC (57) ABSTRACT

Migrating an active VM from a first data center to a second data center having a passive counterpart of the active VM includes freezing the active VM at the first data center, creating an active VM at the second data center that corresponds to the passive counterpart, and restarting the active VM at the second data center. Migrating an active VM from a first data center to a second data center may also include waiting for the passive counterpart to be synchronized with the active VM at the first data center prior to converting the passive counterpart. Creating the active VM at the second data center may include providing a snapshot of a volume containing the passive VM.

20 Claims, 6 Drawing Sheets

(56) References Cited

U.S. PATENT DOCUMENTS

| | | | |
|---|---|---|---|
| 2010/0250824 A1* | 9/2010 | Belay | 711/6 |
| 2011/0072430 A1* | 3/2011 | Mani | 718/1 |
| 2011/0208908 A1* | 8/2011 | Chou et al. | 711/112 |
| 2011/0289345 A1* | 11/2011 | Agesen et al. | 714/4.11 |
| 2011/0314155 A1* | 12/2011 | Narayanaswamy et al. | 709/226 |
| 2011/0314470 A1* | 12/2011 | Elyashev et al. | 718/1 |
| 2012/0084445 A1* | 4/2012 | Brock et al. | 709/226 |
| 2012/0084782 A1* | 4/2012 | Chou et al. | 718/102 |
| 2012/0096458 A1* | 4/2012 | Huang et al. | 718/1 |
| 2012/0102135 A1* | 4/2012 | Srinivasan et al. | 709/213 |
| 2012/0110574 A1* | 5/2012 | Kumar | 718/1 |
| 2014/0201574 A1* | 7/2014 | Manchek et al. | 714/38.13 |

OTHER PUBLICATIONS

"Implementing Virtual Provisioning on EMC Symmetrix DMX with VMware Virtual Infrastructure," VMWare, EMC Corporation, White paper, 2008, 30 pp.

U.S. Appl. No. 12/924,388, filed Sep. 27, 2010, Balcha et al.

* cited by examiner

VM MOBILITY OVER DISTANCE

BACKGROUND OF THE INVENTION

1. Technical Field

This application relates to the field of storage devices, and more particularly to the field of migrating virtual machines between storage devices.

2. Description of Related Art

It is desirable to be able to move Virtual Machines (VMs) from one data site to another for a number of reasons, including, for example, disaster avoidance, testing, load balancing, and following the sun/moon. The VMs may be organized in multi-volume repositories, where each volume may include multiple VMs. One way to do this would be to freeze all VMs on a particular volume at a first data site and then copy the volume from the first site to a second site using any appropriate technique, such as synchronous or asynchronous volume replication. Once the entire volume has been copied, the VMs may then be restarted at the second data site.

However, such a straightforward solution, while relatively simple to implement, may be unsatisfactory for a number of reasons. For instance, it may be desirable to migrate only some of the VMs of a volume rather than all the VMs (provide granularity), which the above does not do. In addition, it is desirable to make the operation as seamless as possible so that, while it may be OK to freeze and restart a particular VM for a short period of time, it may not be acceptable to do so for as long as it takes to replicate an entire volume. Furthermore it is desirable that the VMs be protected at all times so that data is not lost (or at least remains consistent) even if one of the sites stops working. It is also desirable that, if a link and/or a site stops working during a transition, the system does not crash.

Accordingly, it is desirable to provide a system that can migrate VMs in a way that addresses the issues set forth above.

SUMMARY OF THE INVENTION

According to the system described herein, migrating an active VM from a first data center to a second data center having a passive counterpart of the active VM includes freezing the active VM at the first data center, creating an active VM at the second data center that corresponds to the passive counterpart, and restarting the active VM at the second data center. Migrating an active VM from a first data center to a second data center may also include waiting for the passive counterpart to be synchronized with the active VM at the first data center prior to creating the active VM at the second data center. Migrating an active VM from a first data center to a second data center may also include creating on the first data center a passive counterpart to the active VM on the second data center. Migrating an active VM from a first data center to a second data center may also include waiting for the passive counterpart on the first data center to be synchronized with the active VM on the second data center prior to restarting the active VM on the second data center. Creating the active VM at the second data center may include providing a snapshot of a volume containing the passive VM. Migrating an active VM from a first data center to a second data center may also include, following providing the snapshot, copying data from the snapshot at the second data center to the active VM at the second data center. Migrating an active VM from a first data center to a second data center may also include converting the active VM at the first data center to a passive VM at the first data center. The passive VM at the first data center may be a passive counterpart to the active VM at the second data center.

According further to the system described herein, computer software, provided in a non-transitory computer-readable medium, migrates an active VM from a first data center to a second data center having a passive counterpart of the active VM. The software includes executable code that creates an active VM at the second data center following the active VM at the first data center being frozen where the active VM at the second data center corresponds to the passive counterpart and executable code that restarts the active VM at the second data center. The software may also include executable code that waits for the passive counterpart to be synchronized with the active VM at the first data center prior to creating the active VM at the second data center. The software may also include executable code that creates on the first data center a passive counterpart to the active VM on the second data center. The software may also include executable code that waits for the passive counterpart on the first data center to be synchronized with the active VM on the second data center prior to restarting the active VM on the second data center. Executable code that creates the active VM at the second data center may provide a snapshot of a volume containing the passive VM. The software may also include executable code that copies data from the snapshot at the second data center to the active VM at the second data center following providing the snapshot. The software may also include executable code that converts the active VM at the first data center to a passive VM at the first data center. The passive VM at the first data center may be a passive counterpart to the active VM at the second data center.

DETAILED DESCRIPTION OF VARIOUS EMBODIMENTS

Figure 1:
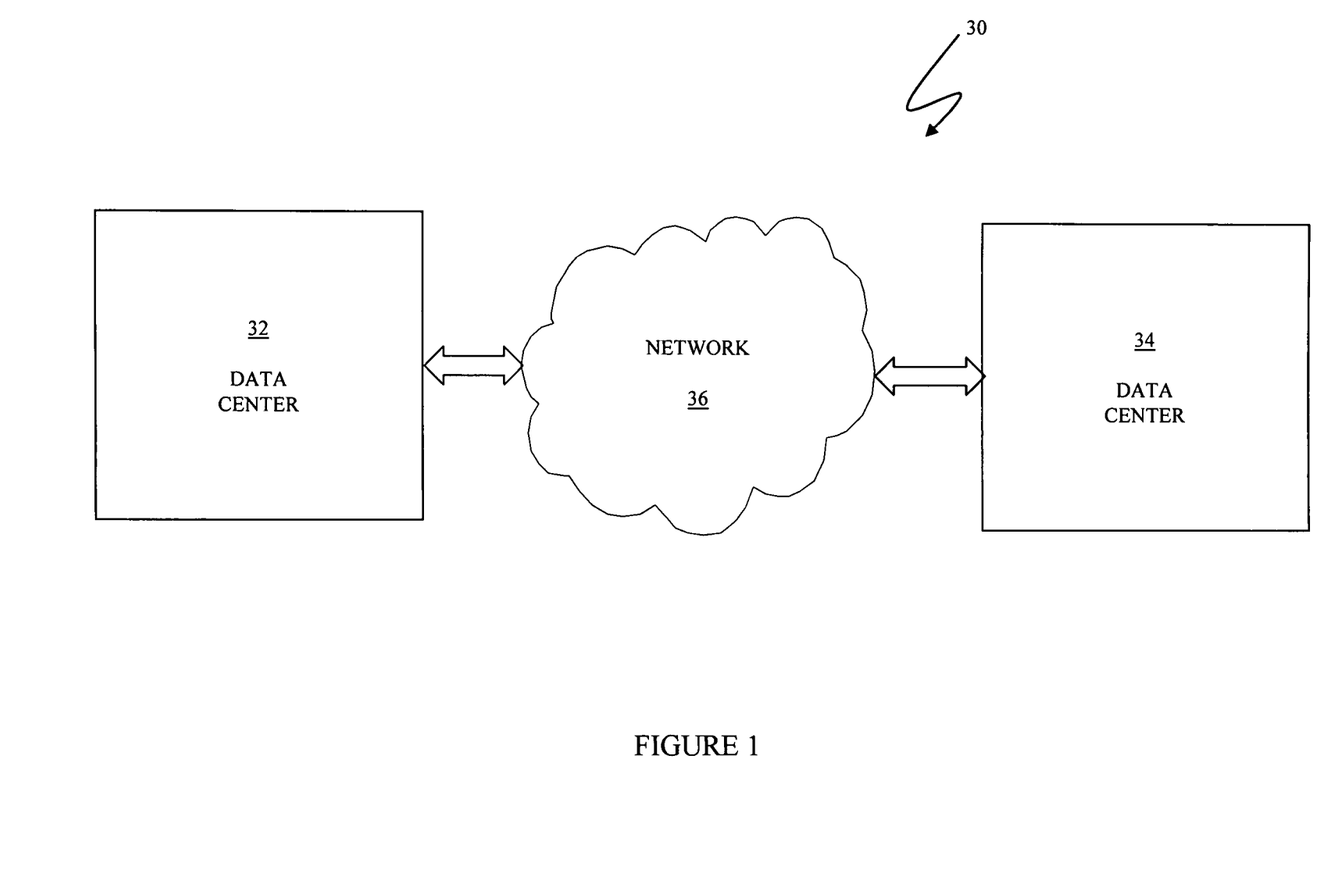
FIG. 1 is a schematic a diagram that shows data centers coupled via a network according to an embodiment of the system described herein.

Referring to FIG. 1, a system 30 includes a first data center 32 in communication with a second data center 34 via a network 36. Each of the data centers 32, 34 may include a plurality of storage devices and processors (not shown in FIG. 1) for executing applications using a plurality of virtual machines (VMs). The VMs may be configured using any appropriate server virtualization technology, such as that provided by VMware, Inc. of Palo Alto, Calif. Other VM technology may be used, including conventional VM technology provided by other vendors.

The data centers 32, 34 may contain any number of processors and storage devices that are configured to provide the functionality described herein. In an embodiment herein, the storage devices may be Symmetrix storage arrays provided by EMC Corporation of Hopkinton, Mass. Other types/models of storage devices may be used in addition to, or instead of, the Symmetrix storage arrays. Different types of storage devices and different types of processing devices may be used. The data centers 32, 34 may be configured similarly to each other or may be configured differently.

The network 36 may be any network or similar mechanism allowing data communication between the data centers 32, 34. In an embodiment herein, the network 36 may be the public Internet, in which case each of the data centers 32, 34 are coupled thereto using any appropriate mechanism. In other embodiments, the network 36 may represent a direct connection (e.g., a physical connection) between the data centers 32, 34.

Figure 2:
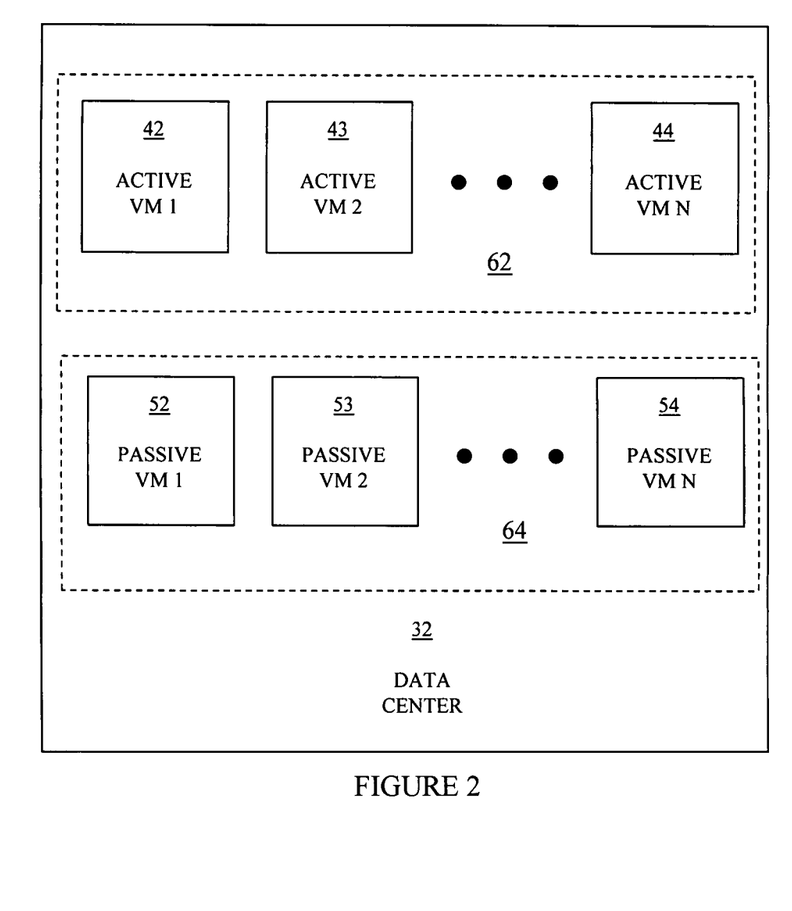
FIG. 2 is a schematic diagram illustrating in more detail a data center with active and passive VMs according to an embodiment of the system described herein.

Referring to FIG. 2, the data center 32 is shown in more detail as including a plurality of active VMs 42-44 and a plurality of passive VMs 52-54. The other data center 34 may be similarly configured with respect to VMs. In an embodiment herein, data centers include active VMs that are directly operational and passive VMs that are images of active VMs on other data centers. For example, the active VMs 42-44 may have corresponding passive VM counterparts at the data center 34 and, similarly, the passive VMs 52-54 may be counterparts to active VMs at the data center 34. In an embodiment herein, the passive VMs 52-54 may be used for failover so that, for example, if one or more corresponding active VMs stops working (e.g., due to hardware failure), it is possible to convert the corresponding passive VM into an active VM and continue work with the newly-activated VM.

The active VMs 42-44 may be provided in an active repository 62, which includes one or more logical storage volumes (not shown in FIG. 2) for maintaining the active VMs 42-44. Similarly, the passive VMs 52-54 may be provided in a passive repository 64, which includes one or more logical volumes (not shown in FIG. 2). Each of the volumes of the active and passive repositories may include multiple VMs.

Figure 3:
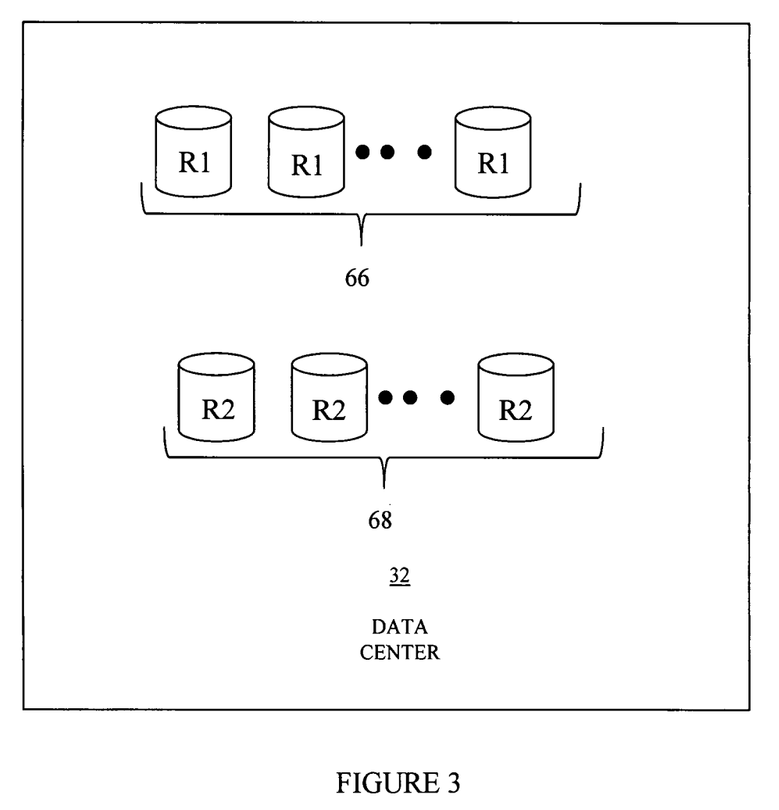
FIG. 3 is a schematic diagram illustrating in more detail a data center with source and destination volumes according to an embodiment of the system described herein.

Referring to FIG. 3, the data center 32 is shown as including a plurality of R1 (source) volumes 66 and a plurality of R2 (target) volumes 68. The R1 volumes 66 may correspond to the active repository 62, shown in FIG. 2 and described elsewhere herein. Similarly, the R2 volumes 68 may correspond to the passive repository 64, shown in FIG. 2 and described elsewhere herein. In an embodiment herein, devices at the data centers 32, 34 may implement SRDF/S (synchronous) and/or SRDF/A (asynchronous) mirroring protocols provided by EMC Corporation of Hopkinton, Mass. Of course, other appropriate mirroring/copying protocols (possibly provided by other vendors) may be used instead of and/or in addition to SRDF, consistent with the discussion herein. The mirroring/copying protocols provide a consistent data image at the target device. In the case of using SRDF/S, the target data image may be nearly identical to the source data image. In the case of using SRDF/A (used, for example, when the data centers 32, 34 are relatively far apart), the target data image may be delayed somewhat.

In an embodiment herein, the active VMs may be provided on the R1 volumes while the passive VMs are provided on the R2 volumes. Thus, an already-existing mirroring/copying mechanism may be used to maintain the passive VMs rather than needing to create an entirely new mechanism for this. As the active VMs are modified during running, the passive VMs are continuously updated by, for example, the SRDF mechanism that mirrors data between the data centers 32, 34.

It is desirable to be able to efficiently migrate one or more VMs from a source one of the data centers 32, 34 to a target one of the data centers 32, 34. For example, initially, one or more particular VMs may be active at the data center 32 and passive at the data center 34. It is desirable to perform a migration so that the one or more particular VMs end up active at the data center 34 and passive at the data center 32. This is described in detail below.

Figure 4:
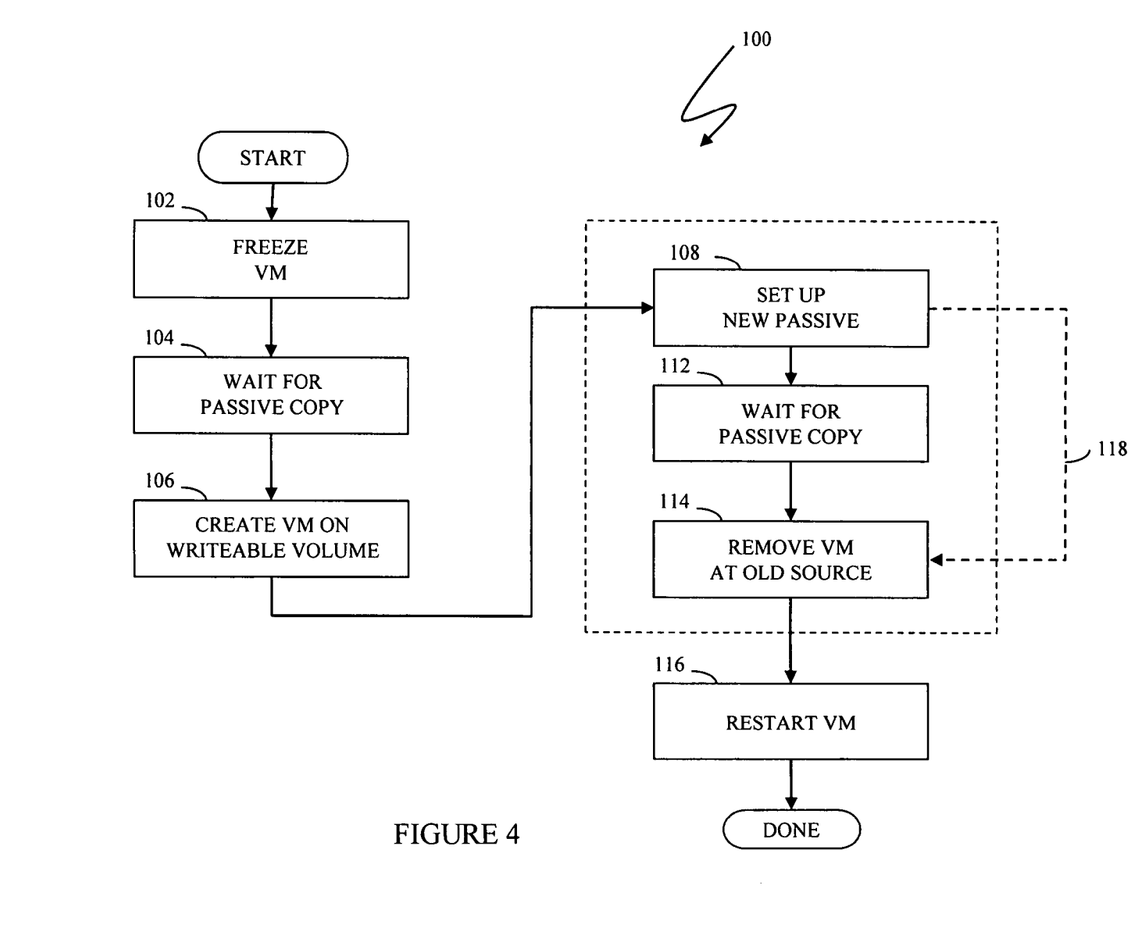
FIG. 4 is a flow chart illustrating steps performed in connection with migrating a VM according to an embodiment of the system described herein.

Referring to FIG. 4, a flow chart 100 illustrates processing performed in connection with migrating one or more VMs from a source data center to a target data center. Note that, although the discussion herein may refer to a single VM, the processing illustrated may be adapted to migrating multiple VMs. Note also that, although the system is illustrated herein with the two data centers 32, 34, it is possible to have more than two data centers so that, for example, a first group of active VMs on a particular data center may have corresponding passive VMs on a first other data center while a second group of active VMs on the particular data center may have corresponding passive VMs on a second other data center different from the first data center.

Processing for the flow chart 100 begins at a step 102 where the VM being migrated is frozen (suspended). In some embodiments, the VM being migrated may be shut down completely. Following the step 102 is a step 104 where the system waits for the corresponding passive VM to be synchronized with the active VM using any appropriate data synchronization technique (e.g., SRDF/A). As discussed elsewhere herein, there may be a delay from when data changes on the active VM to when the change is reflected on the corresponding passive VM. Note, however, that freezing the VM at the step 102 prevents the active VM from changing further so that, irrespective of the delay, it is possible for the active and passive VMs to have the same data after the step 104. Waiting at the step 104 allows the passive VM at the target data center to be synchronized with the active VM at the source data center.

Following the step 104 is a step 106 where the passive VM at the target data center is moved/copied to a writeable volume by, for example, copying data from the passive VM from the R2 device at the target data center to a writeable volume at the target data center. However, as described in more detail elsewhere herein, there are other ways to instantiate the VM to a writeable volume without necessarily copying all of the data. The step 106 represents creating an active VM at the target data center that corresponds to the passive VM at the target data center.

Following the step 106 is a step 108 where a new corresponding passive VM is set up (e.g., on the old source). This may be performed, for example, in instances where the active VM is provided at an R1 device at the target data center. Following the step 108 is a step 112 where the system waits for all of the data to be copied to the new passive VM (i.e., for the active and passive VMs to be synchronized). Waiting at the step 112 provides failover for the new active VM. Following the step 112 is a step 114 where the active VM is removed from the R1 volume of the old source. Following the step 114 is a step 116 where the VM is restarted at the target. Following the step 116, processing is complete.

In some embodiments, it is possible to remove the VM at the R1 of the old source and restart the VM at the target prior to the VM image being completely copied to the passive VM at the source data center. This is illustrated by an alternative path 118 where the step 112 is skipped. Of course, doing this means that the active VM may be running at the target data center prior to there being a passive VM to be used in case of a failover.

In some oases, it may be desirable to create a writeble version of the active VM at the target more efficiently than occurs when all of the data for the passive VM is copied from the R2 volume to a writeable volume, such as an R1 volume. One way to do this is to use a snapshot of the R2 image. This is discussed in more detail below.

Figure 5:
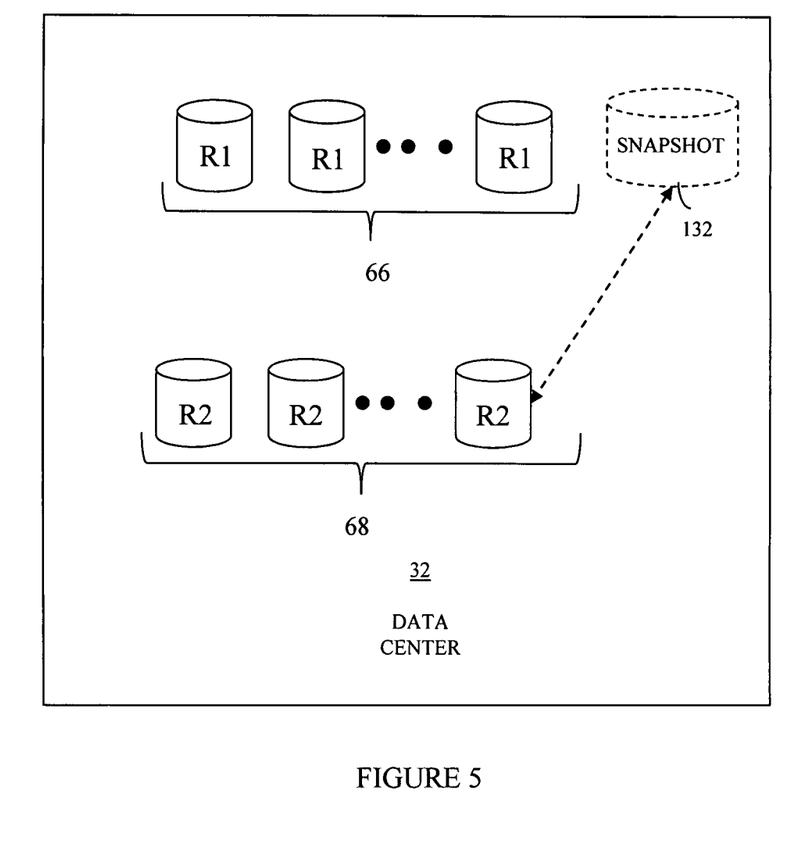
FIG. 5 is a schematic diagram illustrating in more detail a data center with source and destination volumes and a snapshot of one of the destination volumes according to an embodiment of the system described herein.

Referring to FIG. 5, the data center 32 is shown with the plurality of R1 devices 66 and the plurality of R2 devices 68, as shown in FIG. 3 (discussed above), as well as a writeable snapshot volume 132 of one of the R2 volumes 68. Any appropriate technique may be used to provide the snapshot volume 132, such as any one of a variety of conventional snapshot techniques. In an embodiment herein, the snapshot volume 132 is provided using the mechanism described in U.S. Pat. No. 7,340,489 to Vishlitzky, et al., which is incorporated by reference herein. Once the snapshot volume 132 is created (which, in many cases, is almost instantaneous), then the active VM becomes startable from the snapshot. Note that, although the snapshot is performed for the entire R2 volume, only a subset of the VMs thereof (possibly only one VM) may be of interest (i.e., being migrated and restarted at the data center).

Figure 6:
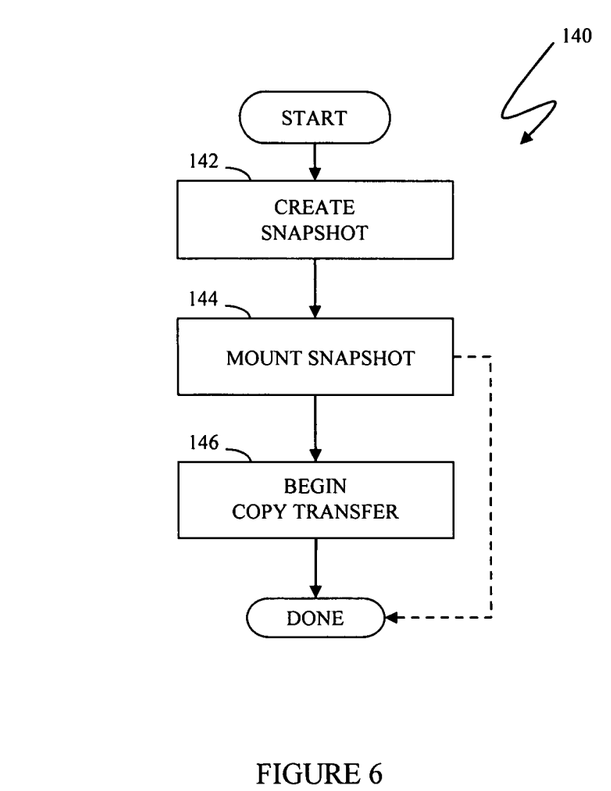
FIG. 6 is a flow chart illustrating steps performed in connection with copying a VM from a target volume to a source volume at a target data center according to an embodiment of the system described herein.

Referring to FIG. 6, a flow chart 140 illustrates steps performed in connection with using a snapshot to provide the VM at the target data center to a writeable volume. Processing begins at a first step 142 where the snapshot is created. As discussed elsewhere herein, any appropriate snapshot technology may be used. Following the step 142 is a step 144 where the snapshot volume created at the step 142 is mounted in the file system. The processing performed at the step 144 is implementation dependent, but in any event involves performing conventional processing to make the snapshot volume a writeable logical volume. Following the step 144 is a step 146 where the system begins a copy/transfer to migrate VMs from the snapshot volume onto a writeable volume. The step 146 is optional so that, in some embodiments, it is acceptable to use the active VMs on the snapshot volume for the duration of the existence of the active VM. However, in some cases, it may be desirable to eventually move the active VM from the snapshot to a writeable volume. For instance, note that the snapshot volume is dependent on the state (and existence) of the underlying R2 volume while a conventional volume is not. Following the step 146 (or following the step 144 if the step 146 is not implemented), processing is complete.

The steps 108, 112, 114 of the flowchart 100, discussed above, represent copying data for the VM from the target center back to the source data center to establish the passive VM. However, in some cases, it may be desirable to use the data for the VM that is already present at the source data center rather than copy the same data from the target data center back to the source data center.

Figure 7:
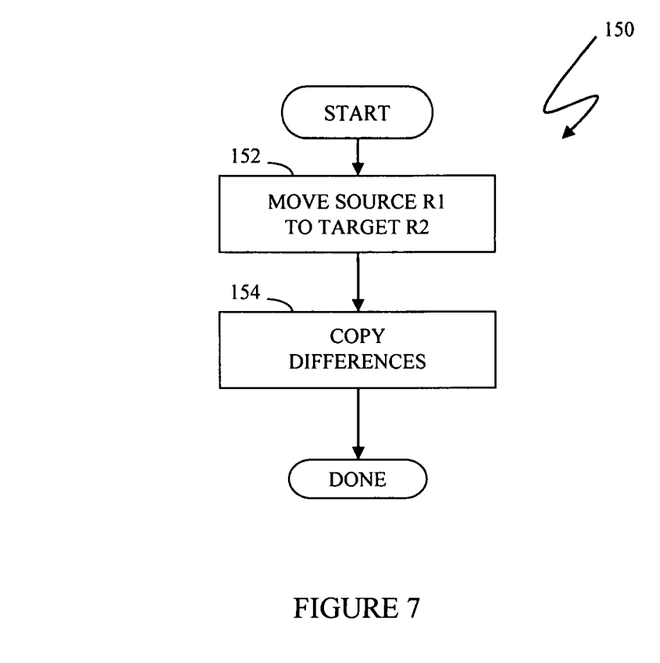
FIG. 7 is a flow chart illustrating steps performed in connection with moving a VM from a source volume to a target volume at a source data center according to an embodiment of the system described herein.

Referring to FIG. 7, a flow chart 150 illustrates steps that may be performed in lieu of the steps 108, 112, 114 in order to establish a passive VM at the source data center. Processing begins at a first step 152 where the data for the VM is copied from R1 (source) volume to an R2 (target) volume at the source data center. Copying at the step 152 may be performed using any appropriate technique, including conventional straight-forward copying of the data. Note also that it is possible to use a snapshot in a technique similar to that discussed above in connection with the flow chart 140. In particular, it may be possible to avoid copying data altogether by pointing the R2 volume to the same data used by the R1 volume.

Following the step 152 is a step 154 where any differences between the formerly active VM at the source data center and the now passive VM at the source data center are copied from the target data center. Note that, in some instances, there may be slight differences between the active VM as it existed at the source data center and the active VM as it now exists at the target data center. For example, local IP addresses may change and/or the identification of local resources (e.g., printers) may change. The target data center may handle those differences in connection with transitioning the VM from a passive VM to an active VM. At the step 154, any differences are transmitted from the target data center back to the source data center so that the passive VM contains the same data as the active VM. Following the step 154, processing is complete.

Note that additional storage space may be used as VMs are migrated from one of the data centers 32, 34 to the other one of the data centers 32, 34. For example, during migration of an active VM from the data center 32 to the data center 34, there may be two versions of the VM (active and passive) on the data center 32 and possibly also on the data center 34. In an embodiment herein, the data centers 32, 34 may be provisioned with additional available storage (e.g., an additional ten percent of total capacity) for migrating the VMs. In addition, one or more of the data centers 32, 34 may use thin provisioning with a mechanism for reclaiming released storage space. Such a mechanism is disclosed in U.S. patent application Ser. No. 12/924,388, filed on Sep. 27, 2010 titled: "STORAGE SPACE RECLAIMING FOR VIRTUAL PROVISIONING", which is incorporated by reference herein and is assigned to the assignee of the present application. Users who wish to move (rather than copy) the VMs from one data center to another may delete the source VMs once the copy operation is completed, thus allowing the space to be reclaimed. In such a case, no additional storage is used irrespective of the number of VMs that are moved.

Note that, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system described herein includes computer software, in a non-transitory computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method, of migrating an active VM from a first data center to a second data center having a first passive counterpart of the active VM, the method comprising:
   freezing the active VM at the first data center resulting in a suspended VM at the first data center;
   creating an active VM at the second data center that corresponds to the first passive counterpart at the second data center;
   restarting the active VM at the second data center;
   creating at the first data center a second passive counterpart, the second passive counterpart corresponding to the active VM on the second data center, and the second passive counterpart coexisting with the suspended VM at the first data center; and waiting for the first passive counterpart to be synchronized with the suspended VM at the first data center prior to creating the active VM at the second data center.

2. The method, according to claim 1, wherein creating the active VM at the second data center includes providing a snapshot of a volume containing the first passive counterpart.

3. The method, according to claim 2, further comprising:

following providing the snapshot, copying data from the snapshot at the second data center to the active VM at the second data center.

4. The method according to claim 1, further comprising:

after creating the second passive counterpart at the first data center, deleting the suspended VM at the first data center.

5. The method according to claim 4, wherein thin provisioning processing is used in connection with reclaiming released storage space after deleting the suspended VM at the first data center.

6. A method of migrating an active VM from a first data center to a second data center having a first passive counterpart of the active VM, the method comprising:

freezing the active VM at the first data center resulting in a suspended VM at the first data center;

creating an active VM at the second data center that corresponds to the first passive counterpart at the second data center;

restarting the active VM at the second data center;

creating at the first data center a second passive counterpart, the second passive counterpart corresponding to the active VM on the second data center, and the second passive counterpart coexisting with the suspended VM at the first data center; and waiting for the first second passive counterpart on the first data center to be synchronized with the active VM on the second data center prior to restarting the active VM on the second data center.

7. The method, according to claim 6, wherein creating the active VM at the second data center includes providing a snapshot of a volume containing the first passive counterpart.

8. The method, according to claim 7, further comprising:

following providing the snapshot, copying data from the snapshot at the second data center to the active VM at the second data center.

9. The method according to claim 6, further comprising:

after creating the second passive counterpart at the first data center, deleting the suspended VM at the first data center.

10. The method according to claim 9, wherein thin provisioning processing is used in connection with reclaiming released storage space after deleting the suspended VM at the first data center.

11. A non-transitory computer-readable medium storing software that migrates an active VM from a first data center to a second data center having a first passive counterpart of the active VM, the software comprising:

executable code that freezes the active VM at the first data center resulting in a suspended VM at the first data center;

executable code that creates an active VM at the second data center following the active VM at the first data center being frozen, wherein the active VM at the second data center corresponds to the first passive counterpart at the second data center;

executable code that restarts the active VM at the second data center;

executable code that creates at the first data center a second passive counterpart, the second passive counterpart corresponding to the active VM on the second data center and the second passive counterpart coexisting with the suspended VM at the first data center; and executable code that waits for the first passive counterpart to be synchronized with the suspended VM at the first data center prior to creating the active VM at the second data center.

12. The non-transitory computer-readable medium according to claim 11, wherein the executable code that creates the active VM at the second data center provides a snapshot of a volume containing the first passive counterpart.

13. The non-transitory computer-readable medium according to claim 12, wherein the software further comprises:

executable code that copies data from the snapshot at the second data center to the active VM at the second data center following providing the snapshot.

14. The non-transitory computer-readable medium according to claim 11, wherein the software further comprises:

executable code that, after creating the second passive counterpart at the first data center, deletes the suspended VM at the first data center.

15. The non-transitory computer-readable medium according to claim 14, wherein thin provisioning processing is used in connection with reclaiming released storage space after deleting the suspended VM at the first data center.

16. A non-transitory computer-readable medium storing software that migrates an active VM from a first data center to a second data center having a first passive counterpart of the active VM, the software comprising:

executable code that freezes the active VM at the first data center resulting in a suspended VM at the first data center;

executable code that creates an active VM at the second data center following the active VM at the first data center being frozen, wherein the active VM at the second data center corresponds to the first passive counterpart at the second data center;

executable code that restarts the active VM at the second data center;

executable code that creates at the first data center a second passive counterpart, the second passive counterpart corresponding to the active VM on the second data center and the second passive counterpart coexisting with the suspended VM at the first data center; and executable code that waits for the second passive counterpart on the first data center to be synchronized with the active VM on the second data center prior to restarting the active VM on the second data center.

17. The non-transitory computer-readable medium according to claim 16, wherein the executable code that creates the active VM at the second data center provides a snapshot of a volume containing the first passive counterpart.

18. The non-transitory computer-readable medium according to claim 17, wherein the software further comprises:

executable code that copies data from the snapshot at the second data center to the active VM at the second data center following providing the snapshot.

19. The non-transitory computer-readable medium according to claim 16, wherein the software further comprises:

executable code that, after creating the second passive counterpart at the first data center, deletes the suspended VM at the first data center.

20. The non-transitory computer-readable medium according to claim 19, wherein thin provisioning processing is used in connection with reclaiming released storage space after deleting the suspended VM at the first data center.

\* \* \* \* \*